Figure 1:
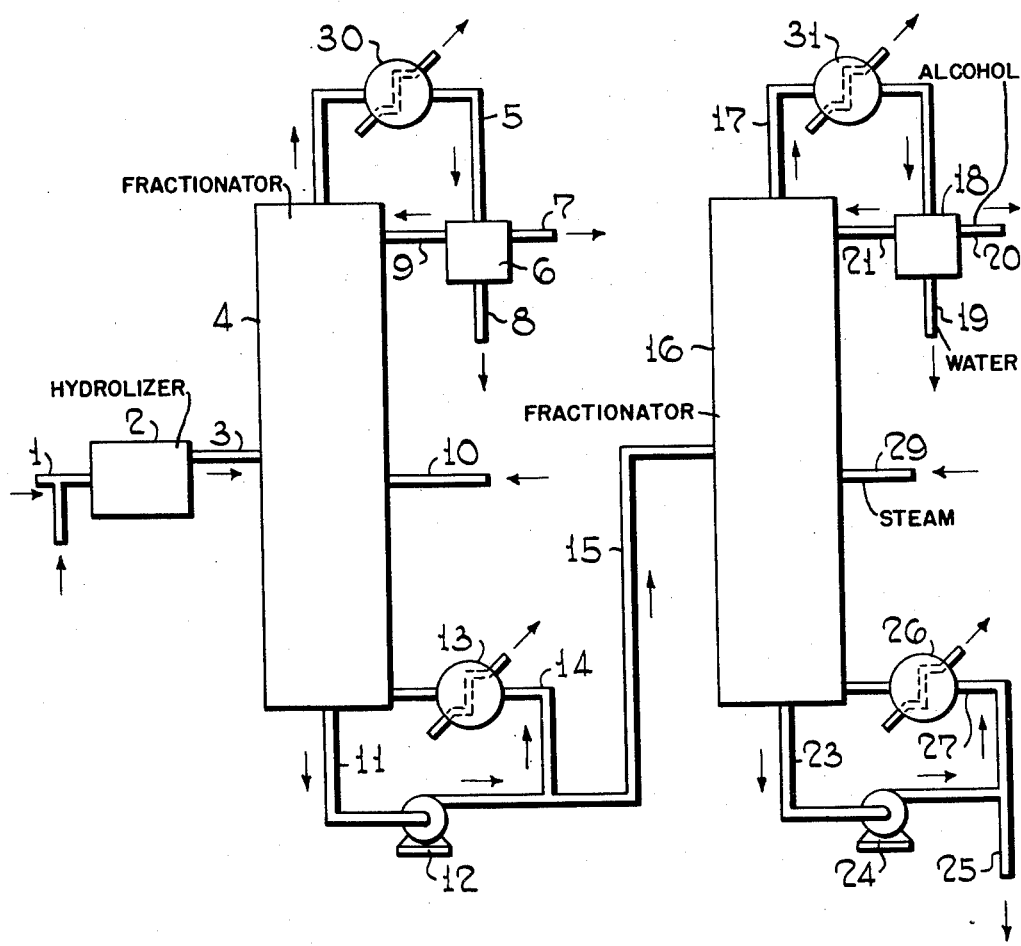

April 28, 1953

G. P. HAMNER ET AL 2,636,847

PURIFICATION OF OXO ALCOHOLS BY
CONTROLLED WATER TREATMENT

Filed June 12, 1951

2 SHEETS—SHEET 1

Glen P. Hamner
Thomas G. Jones   Inventors

By Henry Berk   Attorney

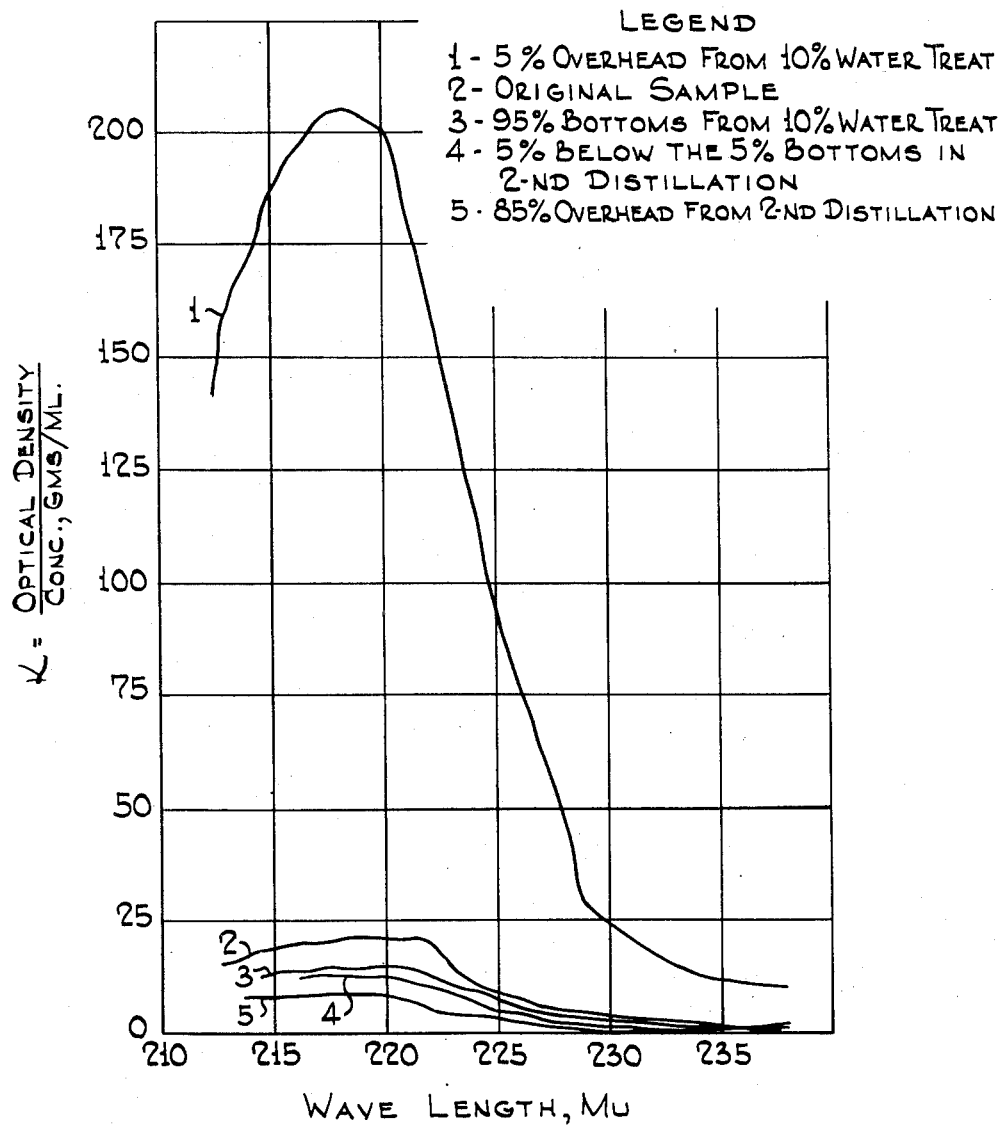

Patented Apr. 28, 1953

2,636,847

UNITED STATES PATENT OFFICE 2,636,847

PURIFICATION OF OXO ALCOHOLS BY CONTROLLED WATER TREATMENT

Glen P. Hamner, Baton Rouge, and Thomas G. Jones, East Baton Rouge, La., assignors to Standard Oil Development Company, a corporation of Delaware Application June 12, 1951, Serial No. 231,236

5 Claims. (Cl. 202—57)

This invention relates to improvements in the methods of purifying synthetic, water-insoluble, primary alcohols. More particularly, it relates to improved methods of purifying synthetic Oxo alcohols of the $C_7$ to $C_{13}$ range containing higher-boiling sulfur, carbonyl, acetal, and ester impurities.

Synthetic branched chain, primary Oxo alcohol products produced by the well-known two-stage Oxo process (see e. g. U. S. Patent 2,327,066 and U. S. Bureau of Mines Publication R1 4270 "Critical Review of Chemistry of the Oxo Synthesis, etc." 1948) have come into commercial use in the production of esters suitable for plasticizers, by reaction of the alcohols with both aliphatic and aromatic acids or anhydrides including such examples as phthalic acid, sebacic acid, oleic acid, stearic acid, lauric acid, maleic acid, adipic acid, and also phthalic and maleic acid anhydrides. Certain of the synthetic alcohols prepared by the oxonation and hydrogenation reaction are known to be especially suitable for the manufacture of ester plasticizers and particularly for use in clear plastics. These include alcohols of from $C_4$ to $C_{13}$ range such as the butyl alcohols, the octanols, and the nonanols with the $C_7$ to $C_{13}$ alcohols preferable. The synthetic alcohols of the $C_8$ series, and particularly those chosen from the iso-octyl type, are among the best type of esterification alcohols to prepare plasticizers, especially the phthalic acid ones.

It is essential that these esters have good color, i. e., a relative absence of color so as not to color the clear resins. This latter criterion is difficult of realization, however, probably because of color-forming impurities present in the synthetic alcohols which are difficult to ascertain, but probably consist of sulfur, carbonyl, acetal, and ester impurities.

The resulting organic acid esters produced from the alcohols in many cases are discolored during the course of the esterification reaction, or become discolored and are subject to deteriorative changes on standing. In either case the esters can be quite unsuitable for use as plasticizers for clear plastic materials.

It has now been found that these alcohols can be freed of these particular color-forming bodies by treatment of the alcohols under specific conditions of temperature and pressure with water so as to hydrolyze the impurities, which are then most readily removed by distillation in the presence of water as steam. A properly conducted steam distillation can also be performed as a single unitary operation, since it simultaneously accomplishes the necessary hydrolysis and the subsequent removal of the impurities.

The reason for the efficacy of the process of this invention is believed to stem from the following. Some of the color-forming impurities present with the Oxo alcohols are higher boiling than the alcohols. The separation of the latter from these impurities by conventional distillation is difficult to achieve, however, because these high-boiling impurities decompose into intermediate-boiling impurities at the alcohol distillation temperatures. These lower-boiling intermediate impurities boil in the range of the desired alcohols and undesirably come over with them in the distillation.

The hydrolysis treatment of this invention results in the conversion of these high-boiling impurities and intermediate-boiling ones into still lower boiling impurities which are easily distilled off from the alcohols. In addition, the steam distillation itself in being conducted at less than normal temperatures prevents further high-boiling impurity degradation which would give trouble. The steam distillation is thus employed among other things to prevent further impurity breakdown during the alcohol separation, and not alcohol product degradation as might be expected from the art.

The alcohols purified in the reaction are preferably obtained by the "Oxo" process. The term "Oxo" process is well understood in the art as referring to a process wherein an olefin feed is first reacted or "oxonated" with carbon monoxide and hydrogen at a temperature between 120° and 250° C., and under a pressure of about 150 to 400 atmospheres in the presence of a cobalt or similar catalyst, generally introduced in the form of a fatty acid salt, to form aldehydes in accordance with the following reaction:

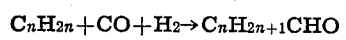

The aldehydes so formed are then catalytically hydrogenated to form the desired alcohols as follows:

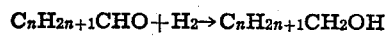

The preferred hydrogenation catalysts are those of the sulfur-sensitive nickel type, though other known hydrogenation catalysts such as the sulfides of nickel, molybdenum and cobalt, with or without support on carbon, silica, etc., can also be used, especially where a rugged sulfur-insensitive catalyst is desired.

The most readily available olefinic feed stocks for the Oxo reaction as outlined above are selected hydrocarbon streams derived from petroleum refinery sources.

The primary, water-immiscible alcohols formed by oxonation of the olefinic materials described above are naturally quite complex in character and the exact composition of many of these products is not known. The $C_8$ Oxo alcohols obtained have thus been found to comprise a mixture of isomers.

The alcohols produced by this process, as stated above, contain sulfur, carbonyl, acetal, and ester impurities.

In general, the entire content of the sulfur which is present in the synthetic Oxo alcohols is in the form of organically combined sulfur. Although the exact type of organic impurities in which the sulfur occurs has not been fully determined, it is believed that the sulfur is present in a variety of forms and that in general it is deleterious in all these forms when occurring in the final alcohol, although certain types of organically combined sulfur are definitely known to be more undesirable than are other sulfur impurities.

Esters, and particularly the phthalic acid esters, can be prepared from these alcohols by any of the conventional methods, as by reacting the alcohol with acid, or with acid anhydride, or by first transforming the alcohol into an alkyl halide and then reacting the latter with a metal salt of the selected acid. For example, phthalate esters may be prepared efficiently by reacting about 2 mols of a suitable alcohol with 1 mol of phthalic anhydride, without any catalyst or in the presence of sulfuric or preferably toluene sulfonic acid catalyst and using a solvent such as benzene as entrainer.

In a number of instances, particularly when the esters are produced in reactors having metallic surfaces exposed to the reacting mixtures, the products are found to be deficient as to the standards required for plasticizers, in such characteristics as odor and color. These undesirable characteristics are believed to be caused by the indicated impurities present in the alcohol product, and certain of them are caused particularly by the sulfur products present in the alcohol. In fact, it has been found that in order to obtain a high grade alcohol which adequately meets all specifications the active, color-producing sulfur content should best be reduced to a value somewhere near 5 parts per million, although somewhat higher total sulfur concentrations can be tolerated, the exact limit of tolerance depending partially upon the form in which the sulfur occurs. Only certain types of the sulfur-containing impurities seem to be among the most active color formers.

The utilization of the hydrolysis procedure of this invention results in the conversion of the high-boiling and resultant intermediate-boiling impurities which normally distill off with the desired Oxo alcohols, into still lower boiling products, which are then readily removed by steam distillation. The alcohol product itself is then steam distilled free of these undesirable impurities. The process of this invention is thus applicable to the crude alcohol as well as the topped alcohol which has already had a prior distillation but still contains these impurities.

The method of operation of this invention comprises adding a total of from 2 to 100 volume per cent water or steam based on the alcohol to the alcohol feed being treated. The alcohol is heated in the liquid phase in a closed system for about 30 minutes to 5 hours at a temperature range above the atmospheric boiling point of water, i. e., a range of from 110° to 200° C., and is then steam distilled at temperatures depending on vapor pressure of alcohol being distilled. The alcohol may be steam distilled and hydrolized in a single distillation zone if the residence time and temperature in the distillation equipment are sufficiently long to give the necessary minimum liquid phase hydrolysis time. Data indicate a minimum of about 30 minutes to be adequate.

In the distillation of the alcohol feed and water after hydrolysis a first fraction of low-boiling impurities and water is taken overhead. The steam distillation of the alcohol itself follows. The alcohol water overhead condensate product separates into two layers from which the purified alcohol is readily separated.

Data have been obtained which indicate most of the carbonyl and sulfur compounds are taken overhead with approximately two to five volume per cent of the alcohol when batch distilling with water a topped hydrolized iso-octyl alcohol obtained from the conventional type distillation. The first steam distillation after hydrolysis is conducted so as to insure that no more than 5% of alcohol is taken off with the impurities. The bottoms residue from the steam distillation is then conveniently subjected to another steam distillation where the alcohol product is taken overhead free of the low-boiling impurities, and the higher-boiling impurities are then taken off as bottoms.

This invention will be better understood by reference to the flow diagram Figure I. A topped $C_8$ alcohol fraction with approximately 10 volume per cent water based on the alcohol are introduced through line 1 into hydrolizer 2. Hydrolizer 2 is operated for 30 or more minutes at a temperature of 125°–200° C. and at a pressure sufficient to maintain the mixture predominantly in the liquid phase. The liquid mixture from line 2 is withdrawn through line 3 to fractionating column 4. Steam is introduced through line 10 into fractionating column 4. The amount of steam introduced is in an amount of 5 to 10 volume per cent water based on the alcohol in fractionator 4. Fractionator 4 is operated in a manner that will permit the withdrawal through line 7 of 5 to 10%, and preferably 2–5 volume per cent, of the alcohol fed to 4, while returning five times as much alcohol through line 9 as is being withdrawn from line 7. A mixture of low-boiling impurities, water and alcohol is thus taken overhead through line 5 through condenser 30 to settler 6. The water settling in 6 is withdrawn through line 8. The indicated amounts of alcohol and low-boiling impurities are withdrawn through line 7. The bottoms of 4 are withdrawn through line 11, passed through pump 12, a part being sent through reboiler 13 and returned to the fractionating tower through line 14 after heating. The remainder is fed through line 15 to fractionator 16. Steam which could be condensed to give 5 to 10 volume per cent water based on the alcohol is fed to column 16 through line 29. Column 16 is operated in a manner that will permit 80-90% of the alcohol being fed through line 1 to be withdrawn through line 20 and so that twice as much alcohol as is being withdrawn through line 20 can be returned as reflux through line 21. The alcohol product free of impurities containing some water is taken overhead through line 17 through condenser 31 to settler 18. The water settling in 18 is withdrawn through line 19, while the product is taken off through line 20. The bottoms from 16 are taken through line 23 and pump 24. They are then divided, 5-10% are removed from the system through line 25, the remainder being circulated through heater 26 and returned to the tower through line 27 for heating.

This invention is illustrated by the following examples:

EXAMPLE I

Three liters of crude iso-octyl alcohol and 300 milliliters of water were charged to a 30-plate Oldershaw column, hydrolized in the indicated manner, and the water and 5% of the alcohol were taken off at 10/1 reflux ratio. An additional 85% of the total alcohol was taken overhead at 2/1 reflux ratio and used for evaluation. The inspections on the overhead fraction and the 85% heart cut are given in the following table. Complete ultra-violet spectra of the fractions are given in Figure II.

|  | Starting Material | 85 percent Heart Cut | First 5 percent Overhead |
|---|---|---|---|
| Specific Gravity, 20/20° C | | 0.8355 | |
| Odor [1] | 3,477 | 5,535 | 6,537 |
| Hydroxyl Number | 432 | 427 | |
| Carbonyl Number | 0.6 | 0.1 | |
| Saponification Number | | <1 | |
| Color, Hazen | | <5 | |
| Sulfur, p. p. m | 59 | 9 | 1,010 |
| Water, Wt. Percent | | 0.06 | |
| Acidity, as acetic acid | | 0.001 | |
| Ester color: | | | |
| Regular, 1 hour | too dark | 25 | 250 |
| KA₂S, 5½ hours | too red | 300 | |
| Engler Distillation: | | | |
| IBP, °C | 179 | 179 | |
| 5 | 181 | 180 | |
| 10 | 181 | 181 | |
| 20 | 181 | 181 | |
| 30 | 182 | 181 | |
| 40 | 182 | 181 | |
| 50 | 182 | 181 | |
| 60 | 182 | 182 | |
| 70 | 183 | 182 | |
| 80 | 183 | 182 | |
| 90 | 184 | 183 | |
| 95 | 184 | 183 | |
| Dry Point | 197 | 187 | |
| FBP | 197 | 189 | |

[1] Crocker-Henderson.

It is apparent from the data that the sulfur-containing impurities were concentrated in the overhead 5% cut to a much greater extent than is obtained in ordinary distillation. It is also apparent that ester colors are much improved in the absence as well as in the presence of $KA_2S$ corrosion strips. It is believed that decrease in U. V. absorption, as shown by Figure I, is a good index of the improvement made in the alcohol.

To compare this type distillation on other finished iso-octyl alcohols another sample was used, and the reflux ratio while removing the water was 5/1 instead of 10/1. The effect of this treat was similar to the one presented above.

EXAMPLE II

In the next distillation 20 volume per cent water was added to the alcohol prior to distillation at 5/1 reflux ratio through a 30-plate column. The results of this distillation have been tabulated below.

*Steam distillation of finished iso-octyl alcohol*

|  | Blank | Fraction | | | | | |
|---|---|---|---|---|---|---|---|
|  |  | 1 | 2 | 3 | 4 | 5 | 6 |
| Vol. Percent of alcohol charged | | 7.5 | 35.0 | 35.0 | 16.6 | 3.7 | 2.2 |
| Temp., ° C | | 100-180 | 180-187 | 187-188 | 188-189 | 189-190 | 190+ |
| Ester Color with KA₂S: | | | | | | | |
| Strip—Hazen | | 125 | 55 | 45 | 40 | 80 | |
| Absorbency— | | | | | | | |
| 400 mu | .085 | 0.105 | .052 | .040 | .033 | .061 | |
| 450 mu | .035 | .055 | .025 | .026 | .018 | .029 | |
| 500 mu | .025 | .040 | .022 | .020 | .016 | .023 | |
| Sulfur, p. p. m | 14 | 115 | 1 | 3 | 9 | 16 | 154 |

These results show a very great amount of the sulfur to have been concentrated in the top 7.5% and bottom 2.2% of the alcohol by the purification procedure.

In an effort to obtain even greater purification by steam distillation fractions 2, 3 and 4 of the preceding distillations were charged with 5 volume per cent water and distilled with a 5/1 reflux ratio. Inspections of the heart 85% cut (5% rejected OH, 10% bottoms) are presented in the following table.

*Inspection of a heart cut obtained by resteam distilling iso-octyl alcohol*

Ester color with $KA_2$ strip absorbency:
  400 mu _____ 0.06
  450 mu _____ 0.026
  500 mu _____ 0.019
Hazen _____ 50
Sulfur, p. p. m _____ 3
Ultraviolet absorption:

$$K = \frac{\text{Absorbency}}{\text{Conc. gms./ml.}}$$

266 mu _____ 0.26
  272 mu _____ 0.25
Ester color with $KA_2S$ chips absorbency
  @ 447 mu _____ 0.063

The odor of this heart cut was very pleasant as compared with regular iso-octyl alcohol. This sample showed the least absorbency at 266 and 272 mu of all samples previously treated.

EXAMPLE III

In the preceding steam distillation trials the maximum amount of water charged with the alcohol was 20 volume per cent, and this water distilled out with the first few per cent alcohol. In the following run sufficient water was added to give both alcohol and water in the still pot throughout the distillation. The fractionation column again contained 30 plates and the reflux ratio was 5/1. Analysis of the various cuts obtained during the distillation has been presented below:

*Distillation of iso-octyl alcohol in the presence of water*

| Cut No. | Vol. per-cent OH | Carbonyl Number | U. V. Absorption | | Sulfur, p. p. m. |
|---|---|---|---|---|---|
| | | | K¹ 266 mu | K 272 mu | |
| 1 | 5 | 6 | 9.45 | 8.65 | |
| 2 | 5 | 3.5 | 7.65 | 7.24 | |
| 3 | 9.7 | 1.0 | 3.41 | ² 3.20 | |
| 4 | 9.7 | 0.5 | 1.96 | ² 1.89 | |
| 5 | 9.7 | 0.4 | 1.00 | ² 0.95 | |
| 6 | 9.7 | 0.3 | 0.61 | ² 0.59 | ³ 18 |
| 7 | 9.7 | 0.5 | 0.45 | ² 0.43 | |
| 8 | 9.7 | 0.7 | 0.31 | ² 0.30 | |
| 9 | 9.7 | 0.5 | 0.31 | ² 0.30 | |
| 10 | 9.7 | 0.5 | 0.31 | ² 0.30 | |
| 11 | 9.7 | 0.7 | 0.45 | ² 0.43 | |
| 12 | 7.5 | 1.2 | 3.54 | 3.45 | |

¹ K=absorbency/conc. gms./ml.
² Blend 82.6% Alcohol.
³ The sulfur content of a heart cut obtained by straight distillation was 36 p. p. m. sulfur.

The sulfur content of a heart cut alcohol distilled in the presence of water was ½ that of a heart cut obtained by conventional distillation.

EXAMPLE IV

One hundred barrel per day plant product and 20% water were charged to a stainless steel pressure vessel and heated for 4 hours at 149° C. The alcohol and water were withdrawn, the water separated, and the alcohol phase distilled on a fifteen-plate column at 4 to 1 reflux ratio. Inspections made on the resultant cuts have been presented below:

*Alcohol heated in the presence of water*

| | Ultraviolet Absorption | |
|---|---|---|
| | K 266 mu | K 272 mu |
| Original alcohol | 1.79 | 1.71 |
| Alcohol after treat | 5.9 | 5.2 |
| Distillation of alcohol after treat: | | |
| First 5% Overhead | 15.8 | 15.0 |
| 15–25% Fraction | 1.85 | 1.20 |
| 35–45% Fraction | 1.00 | 0.90 |

The above data show that the ultra-violet absorption of the alcohol was improved by this treatment, but not as much as where a steam distillation is employed.

EXAMPLE V

A sample of crude iso-octyl alcohol was batch distilled with and without adding water to the still pot. These distillations were performed through a 30-plate column at 5/1 reflux ratio. The 100°–179° and 179°–189° C. fractions were examined with the following results:

*Crude iso-octyl alcohol (untreated) distilled with and without adding water to the still pot*

| Inspections | Without ¹ Added Water | | With Added Water | |
|---|---|---|---|---|
| | 100–179° C. | 179–189° C. | 100–179° C. | 179–189° C. |
| Hydroxyl Number | | 420 | | 424 |
| Carbonyl Number | | 2.2 | | |
| Ester Color: | | | | |
| Esso Labs. Strip Absorbency— | | | | |
| 400 mu | | 0.343 | | 0.352 |
| 450 mu | | 0.116 | | 0.120 |
| 500 mu | | 0.076 | | 0.073 |
| KA₂S Strip Absorbency— | | | | |
| 400 mu | | 0.090 | | 0.065 |
| 450 mu | | 0.040 | | 0.030 |
| 500 mu | | 0.023 | | 0.020 |
| Sulfur | | 50 | | 19 |
| Ultraviolet Absorption K²: | | | | |
| 266 mu | ³ 18.5 | 1.05 | 20.5 | 0.55 |
| 272 mu | 22.5 | 1.05 | 26.5 | 0.55 |

¹ This cut was removed immediately when cracking was encountered near the end of the alcohol fraction. A small portion of material caught during cracking showed a carbonyl number of 16.
² K=absorbency/conc. gms./ml.
³ Crude contained only traces of water.

The alcohol recovered when water was added to the still pot prior to distillation was lower in sulfur and ultra-violet absorption, and hydroxyl number was slightly better than the crude distilled without adding water.

EXAMPLE VI

Iso-octyl alcohol was prepared in a two-stage Oxo process, utilizing a cobalt oleate catalyst in the first stage. The crude alcohol had a relatively low sulfur content to begin with, and was treated by steam distillation. The results follow:

*Hydro product after caustic scrubber from production of 6/14/19*

| Inspections | Blank Distillation | Distilled with 10% H₂O |
|---|---|---|
| Carbonyl No | 1.9 | 0.4 |
| Ester Color (Absorbency at 447 mu, KA2 Chip Method) | 0.12 | 0.04 |

This example illustrates the marked lowering of the carbonyl number and ester color of the alcohol where the sulfur content was already low prior to the treatment.

These data indicated that water treating and steam distillation improved the quality of the Oxo alcohols as measured by sulfur content, carbonyl content, ultra-violet absorption, and ester color in the presence of metal strips. The effect on samples having a high sulfur content was especially pronounced. It was noted throughout these experiments that both the alcohols and esters from water treated samples had a more agreeable odor than those obtained from untreated samples.

The ester colors of the alcohols are reported in two ways, Hazen color and ultra-violet absorbency. If the Hazen method is used, this is the procedure: the alcohol is treated with phthalic anhydride to give diisoctyl phthalate and the color of the resulting ester is compared visually with Hazen color standards. The ester color is expressed in terms of a Hazen ester color number (Pt-Co scale). The ultra-violet absorption is obtained under a standardized procedure and is reported as absorbency in a 1.0 cm. cell.

It is a further advantage of this invention that the alcohol which is used as the starting feed is recovered in high purity with a substantially reduced content of sulfur and, particularly, with a reduction in the color-forming impurities of the alcohol.

It will be understood further that the foregoing examples have been given merely for purposes of illustration, but that other modifications of the present invention are possible without departing from the scope of the appended claims.

What is claimed is:

1. A process for the treatment of a water-immiscible, primary $C_7$ to $C_{13}$ Oxo alcohol in a mixture produced in a two-stage operation consisting of a first stage in which hydrogen, carbon monoxide and an olefin are contacted in the presence of an oxonation catalyst forming a product predominantly aldehyde and of a second stage in which said aldehyde is catalytically reduced with hydrogen to form the corresponding alcohol, said alcohol mixture containing color-forming impurities including carbonyl, acetal and ester impurities normally separable from the alcohol only with difficulty, which comprises the steps of contacting the alcohol with water in the liquid phase for a minimum of thirty minutes but at a temperature above the atmospheric boiling point of water; distilling off water and impurities which have been rendered lower boiling by the water contacting step leaving a residual boiling mixture; distilling the residual mixture in the presence of steam to take overhead a vaporous alcohol-water mixture; condensing this mixture; and separating the alcohol free of impurities from the water.

2. A process for the treatment of a water-immiscible, primary $C_7$ to $C_{13}$ Oxo alcohol in a mixture produced in a two-stage operation consisting of a first stage in which hydrogen, carbon monoxide and an olefin are contacted in the presence of an oxonation catalyst forming a product predominantly aldehyde and of a second stage in which said aldehyde is catalytically reduced with hydrogen to form the corresponding alcohol, said alcohol mixture containing color-forming impurities including carbonyl, acetal and ester impurities normally separable from the alcohol only with difficulty, which comprises the steps of contacting the alcohol with water in the liquid phase for a minimum of thirty minutes but at a temperature above the atmospheric boiling point of water; distilling the thus-treated mixture in the presence of steam at a temperature such that no more than about 5 volume per cent of the alcohol is taken overhead along with impurities which have been rendered lower boiling by the water contacting step leaving a residual higher-boiling mixture; distilling the residual mixture in the presence of steam to take overhead a vaporous alcohol-water mixture; condensing this mixture; and separating the alcohol free of impurities from the water.

3. A process for the treatment of a water-immiscible, primary $C_7$ to $C_{13}$ Oxo alcohol in a mixture produced in a two-stage operation consisting of a first stage in which hydrogen, carbon monoxide and an olefin are contacted in the presence of an oxonation catalyst forming a product predominantly aldehyde and of a second stage in which said aldehyde is catalytically reduced with hydrogen to form the corresponding alcohol, said alcohol containing color-forming impurities including carbonyl, acetal and ester impurities normally separable from the alcohol only with difficulty, which comprises the steps of contacting the alcohol with water in the liquid phase for a minimum of thirty minutes at a temperature in the range of 110° C. to 200° C.; distilling off water and impurities which have been rendered lower boiling by the water contacting step leaving a residual higher-boiling mixture; distilling the residual mixture in the presence of steam to take overhead a vaporous alcohol-water mixture; condensing this mixture; and separating the alcohol free of impurities from the water.

4. A process for the purification of a water-insoluble, topped primary $C_7$ to $C_{13}$ Oxo alcohol in a mixture produced in a two-stage operation consisting of a first stage in which hydrogen, carbon monoxide and an olefin are contacted in the presence of an oxonation catalyst forming a product predominantly aldehyde and of a second stage in which said aldehyde is catalytically reduced with hydrogen to form the corresponding alcohol, said alcohol containing low-boiling color-forming impurities including sulfur, carbonyl, acetal and ester impurities normally separable from the alcohol only with difficulty, which comprises the steps of contacting the mixture with water in the liquid phase for a minimum of 30 minutes at a temperature in the range of 110°–200° C.; distilling the thus-treated mixture in the presence of steam to take off about 2 to 5 volume per cent of the alcohol overhead along with water and low-boiling impurities; withdrawing a bottoms product from the first distillation; distilling this bottoms product in the presence of steam to take overhead a vaporous fraction comprising Oxo alcohol and water; condensing the vaporous fraction; and separating the alcohol free of impurities from the water.

5. A process such as that described in claim 4 in which the water-immiscible alcohol is a mixture of $C_8$ alcohols derived by the Oxo reaction from a $C_7$ olefin stream of petroleum origin.

GLEN P. HAMNER.
THOMAS G. JONES.

References Cited in the file of this patent

UNITED STATES PATENTS

| Number | Name | Date |
|---|---|---|
| 2,576,030 | Morrell et al. | Nov. 20, 1951 |

FOREIGN PATENTS

| Number | Country | Date |
|---|---|---|
| 957,415 | France | Aug. 22, 1949 |